(12) United States Patent
Zhou et al.

(10) Patent No.: US 10,769,464 B2
(45) Date of Patent: Sep. 8, 2020

(54) FACIAL RECOGNITION METHOD AND RELATED PRODUCT

(71) Applicant: GUANGDONG OPPO MOBILE TELECOMMUNICATIONS CORP., LTD., Dongguan, Guangdong (CN)

(72) Inventors: Haitao Zhou, Guangdong (CN); Lizhong Wang, Guangdong (CN); Fangfang Hui, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 125 days.

(21) Appl. No.: 16/106,954

(22) Filed: Aug. 21, 2018

(65) Prior Publication Data

US 2019/0080188 A1    Mar. 14, 2019

(30) Foreign Application Priority Data

Sep. 12, 2017   (CN) .......................... 2017 1 0822218

(51) Int. Cl.
*G06K 9/00*       (2006.01)
(52) U.S. Cl.
CPC ....... *G06K 9/00906* (2013.01); *G06K 9/0061* (2013.01); *G06K 9/00281* (2013.01); *G06K 9/00288* (2013.01); *G06K 9/00973* (2013.01)
(58) Field of Classification Search
None
See application file for complete search history.

(56) References Cited

U.S. PATENT DOCUMENTS

| 6,542,624 | B1 * | 4/2003 | Oda ................... | G06K 9/00597 382/117 |
| 8,437,513 | B1 * | 5/2013 | Derakhshani ...... | G06K 9/00597 382/115 |
| 8,457,367 | B1 | 6/2013 | Sipe et al. | |

(Continued)

FOREIGN PATENT DOCUMENTS

| CN | 102201061 | 9/2011 |
| CN | 104063714 | 9/2014 |

(Continued)

OTHER PUBLICATIONS

Real-time eye blink detection—tracking, Marc Lalonde et al., IEEE, 0-7695-2786-8, 2007, pp. 1-7 (Year: 2007).*

(Continued)

*Primary Examiner* — Jayesh A Patel
(74) *Attorney, Agent, or Firm* — Hodgson Russ LLP

(57) ABSTRACT

Embodiments of the present disclosure relate to mobile terminal technologies, a facial recognition method and related products are provided. The method includes: acquiring a face image by a mobile terminal; extracting face feature information from the face image and matching the face feature information with a predetermined face feature template by a central processing unit (CPU) of the mobile terminal; performing liveness detection according to the face image by a graphics processing unit of the mobile terminal when the CPU extracts the face feature information from the face image and matches the face feature information with the predetermined face feature template.

16 Claims, 5 Drawing Sheets

(56) References Cited

U.S. PATENT DOCUMENTS

| | | | |
|---|---|---|---|
| 8,787,628 B1* | 7/2014 | Derakhshani | G06K 9/00597 382/117 |
| 2010/0014720 A1 | 1/2010 | Hoyos et al. | |
| 2012/0019703 A1* | 1/2012 | Thorn | G06T 5/002 348/333.03 |
| 2012/0300990 A1* | 11/2012 | Hanna | G06K 9/00617 382/117 |
| 2013/0015946 A1* | 1/2013 | Lau | G06F 21/32 340/5.2 |
| 2013/0016882 A1 | 1/2013 | Cavallini | |
| 2013/0101182 A1* | 4/2013 | Frischholz | G06K 9/00221 382/118 |
| 2013/0169531 A1* | 7/2013 | Jahnke | G06F 3/017 345/158 |
| 2013/0188840 A1* | 7/2013 | Ma | G06K 9/00261 382/107 |
| 2013/0276001 A1* | 10/2013 | Oishi | G06F 1/3212 719/318 |
| 2014/0093140 A1* | 4/2014 | Juveneton | G06K 9/00268 382/117 |
| 2014/0165187 A1* | 6/2014 | Daesung | H04L 63/0861 726/19 |
| 2014/0169641 A1* | 6/2014 | Lee | G06F 21/36 382/116 |
| 2014/0341444 A1 | 11/2014 | Hou et al. | |
| 2016/0062456 A1* | 3/2016 | Wang | G06K 9/00604 382/117 |
| 2016/0117544 A1 | 4/2016 | Hoyos et al. | |
| 2016/0173492 A1* | 6/2016 | Han | H04W 12/06 705/16 |
| 2016/0196052 A1* | 7/2016 | Franklin | G06F 3/04845 715/765 |
| 2016/0323541 A1* | 11/2016 | Nilsson | H04N 7/141 |
| 2016/0335483 A1* | 11/2016 | Pfursich | G06K 9/00899 |
| 2017/0018088 A1* | 1/2017 | Jeong | G06T 15/205 |
| 2017/0345146 A1* | 11/2017 | Fan | G06K 9/00228 |
| 2018/0012007 A1* | 1/2018 | Kim | G06F 21/83 |
| 2018/0089499 A1* | 3/2018 | Sun | G06K 9/0061 |
| 2019/0251334 A1* | 8/2019 | Kawase | G06K 9/00255 |

FOREIGN PATENT DOCUMENTS

| | | |
|---|---|---|
| CN | 105023010 | 11/2015 |
| CN | 105205458 | 12/2015 |
| CN | 105335722 | 2/2016 |
| CN | 105426730 | 3/2016 |
| CN | 105718863 | 6/2016 |
| CN | 105740779 | 7/2016 |
| CN | 106875191 | 6/2017 |
| CN | 107590463 | 1/2018 |

OTHER PUBLICATIONS

Pala et al., "Iris Liveness Detection by Relative Distance Comparisons," IEEE Conference on Computer Vision and Pattern Recognition Workshops, 2017, 8 pages.
Peng, "The Research of Facial Feature Localization in E-learning Fatigue Detection," Masters Thesis, Department of Information Technology, Central China Normal University, May 2008, 42 pages.
Peng, "The Research and Implementation of Iris Recognition Algorithm," Masters Thesis, Guilin University of Electronic Technology, Jun. 2006, 67 pages.
EPO, Office Action for EP Application No. 18193821.8, dated Nov. 8, 2019.
SIPO, Decision of Rejection for CN Application No. 201710822218. 9, dated Sep. 5, 2019.
EPO, Office Action for EP Application No. 18193821, dated Nov. 7, 2018.
WIPO, English translation of the ISR and WO for PCT/CN2018/ 104792, dated Nov. 28, 2018.
Kirk et al., "Introduction" in: "Programming Massively Parallel Processors : A Hands-On Approach," Elsevier Science & Technology, 2012; pp. 1-22.
Singh et al., "Face Recognition with Liveness Detection using Eye and Mouth Movement," International Conference on Signal Propagation and Computer Technology (ICSPCT), 2014, pp. 592-597.
Wu et al., "Stereo Face Recognition System Based on Binocular Vision," Research and Development, 2009, issue 5, pp. 61-64.
SIPO, First Office Action for CN Application No. 201710822218, dated Mar. 25, 2019.
SIPO, Second Office Action for CN Application No. 201710822218, dated May 28, 2019.
EPO, Office Action for EP Application No. 18193821.8, dated Mar. 30, 2020.

* cited by examiner

-90° collection angle     0° collection angle     +90° collection angle

FACIAL RECOGNITION METHOD AND RELATED PRODUCT

CROSS-REFERENCE TO RELATED APPLICATIONS

This application is based on and claims priority of Chinese Patent Application No. 201710822218.9, filed on Sep. 12, 2017, the entire contents of which are incorporated herein by reference.

FIELD

The present disclosure relates to mobile terminal technologies, and more particularly to a facial recognition method and related products.

BACKGROUND

The mobile terminal not only offers convenience for user in life, but also brings risk of leaking personal information.

For example, the mobile terminal has a photo album, chatting records or other personal information stored therein. Besides, the mobile terminal has a mobile payment application which typically has a virtual wallet or binds with a bank card of the user. When the mobile terminal is operated by a user other than the owner of the mobile terminal, the user can look through the chatting records, the photo album in the mobile terminal, or even can purchase and pay for something using the mobile payment application, which poses a threat to security of personal information and property security of the owner.

In order to ensure the security of personal information in the mobile terminal, the mobile terminal can be provided with a facial recognition function. However, the facial recognition has disadvantage of slow speed, such that how to improve the speed of facial recognition has become an urgent problem to be solved.

DISCLOSURE

Embodiments of the present disclosure provide a facial recognition method and related products.

Embodiments of the present disclosure provide a facial recognition method. The method includes: acquiring by a mobile terminal a face image; extracting face feature information by a central processing unit (CPU) of the mobile terminal from the face image and matching the face feature information with a predetermined face feature template; performing by a graphics processing unit (GPU) of the mobile terminal liveness detection according to the face image when the CPU extracts the face feature information from the face image and matches the face feature information with the predetermined face feature template.

Embodiments of the present disclosure provide a mobile terminal. The mobile terminal includes a central processing unit (CPU), a graphics processing unit (GPU), a front camera and a memory. The CPU, the GPU, the front camera and the memory are coupled with each other. The memory is configured to store a face feature template. The front camera is configured to acquire a face image. The CPU is configured to extract face feature information from the face image and to match the face feature information with the face feature template. The GPU is configured to perform liveness detection according to the face image when the CPU extracts the face feature information from the face image and matches the face feature information with the face feature template.

Embodiments of the present disclosure provide a non-transitory computer-readable storage medium, having a computer program for electronic data exchange stored thereon. The computer program causes a computer to perform all or a part of the acts in the method described above. The computer comprises a mobile terminal.

BRIEF DESCRIPTION OF THE DRAWINGS

To illustrate the solutions according to the embodiments of the present disclosure more clearly, accompanying drawings needed for describing the embodiments are briefly introduced below. Obviously, the accompanying drawings in the following descriptions are merely some embodiments of the present disclosure, and persons of ordinary skill in the art may obtain other drawings according to the accompanying drawings without making creative efforts.

EMBODIMENTS OF THE PRESENT DISCLOSURE

In order to clarify the objectives, technologies and advantages of the present disclosure, the solutions of the embodiments of the present disclosure are clearly and completely described below with reference to the accompanying drawings in the embodiments of the present disclosure. Obviously, the described embodiments are merely part of rather than all of the embodiments of the present disclosure. All other embodiments obtained by persons of ordinary skill in the art based on the embodiments of the present disclosure without making creative efforts shall fall within the protection scope of the present disclosure.

In addition, terms such as "first" and "second" are used herein for purposes of description and are not intended to indicate or imply relative importance or significance. As used herein, the terms "comprises," "includes," or any other variation thereof, refer to a non-exclusive inclusion. For example, a process, method, article, or apparatus that comprises a given list of elements is not necessarily limited to only those elements given, but may further include other elements not expressly listed or inherent to such process, method, article, or apparatus.

The mobile terminal involved in embodiments of the present disclosure may include a handheld device, a vehicle-mounted device, a wearable device and a computing device having wireless communication function, or another processing device coupled to a wireless modem, a user equipment (UE) in a variety of forms, a mobile station (MS) and a terminal device and the like. For ease of description, the devices mentioned above are collectively called as mobile terminal. Embodiments of the present disclosure will be described in the followings.

Embodiments of the present disclosure provide a facial recognition method and related products, which may call a central processing unit (CPU) and a graphics processing unit (GPU) of a mobile terminal to perform feature matching and liveness detection of facial recognition in parallel, such that the length of time required for the facial recognition can be reduced, and user experience can be improved. In the following, the facial recognition method and related products will be described in detail.

Figure 1:
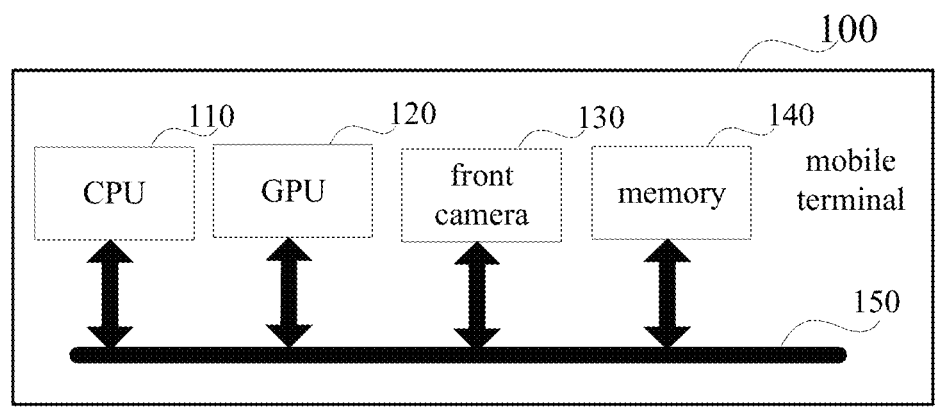
FIG. 1 is a schematic diagram of a mobile terminal according to an embodiment of the present disclosure.

Referring to FIG. 1, FIG. 1 is a schematic diagram of a mobile terminal 100 according to an embodiment of the present disclosure. The mobile terminal 100 includes a central processing unit (CPU) 110, a graphics processing unit (GPU) 120, a front camera 130 and a memory 140. The CPU 110, the GPU 120, the front camera 130 and the memory 140 are coupled to a bus 150, such that the CPU 110, the GPU 120, the front camera 130 and the memory 140 can communicate with each other.

In an embodiment of the present disclosure, the memory 140 is configured to store a face feature template.

The front camera 130 is configured to acquire a face image.

The CPU 110 is configured to extract face feature information from the face image and to match the face feature information with the face feature template.

The GPU 120 is configured to perform liveness detection according to the face image when the CPU 110 extracts face feature information from the face image and matches the face feature information with the face feature template.

In the embodiment of the present disclosure, the facial recognition is divided into feature matching (i.e., extracting the face feature information from the face image and matching the face feature information with the face feature template) and liveness detection, and the CPU and the GPU are called to perform the feature matching and the liveness detection in parallel, such that the length of time required for the facial recognition can be reduced.

Figure 2:
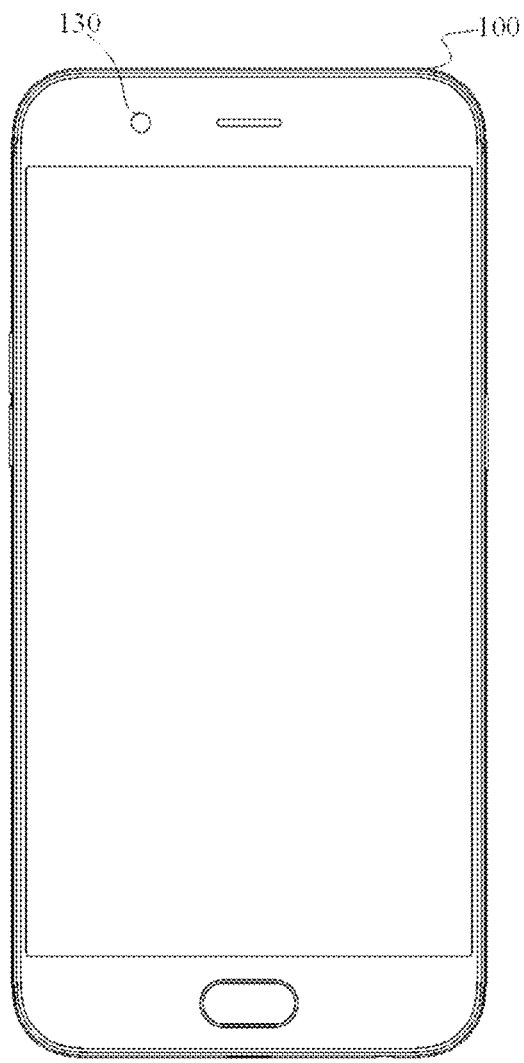
FIG. 2 is a schematic diagram of a mobile terminal according to another embodiment of the present disclosure.

Referring to FIG. 2, FIG. 2 is a schematic diagram of a mobile terminal 100 according to another embodiment of the present disclosure. As illustrated in FIG. 2, the front camera 130 may be disposed above a displaying screen, such that the front camera 130 can acquire a face image of a user when the user operates the mobile terminal.

As a possible implementation, the facial recognition may be triggered by operations of unlocking the mobile terminal, looking through chatting records in the mobile terminal, looking through a photo album in the mobile terminal and/or payment using the mobile terminal. When the facial recognition is failed, the operation requested by the user is rejected, such that security of personal information of the user in the mobile terminal can be guaranteed.

Figure 3:
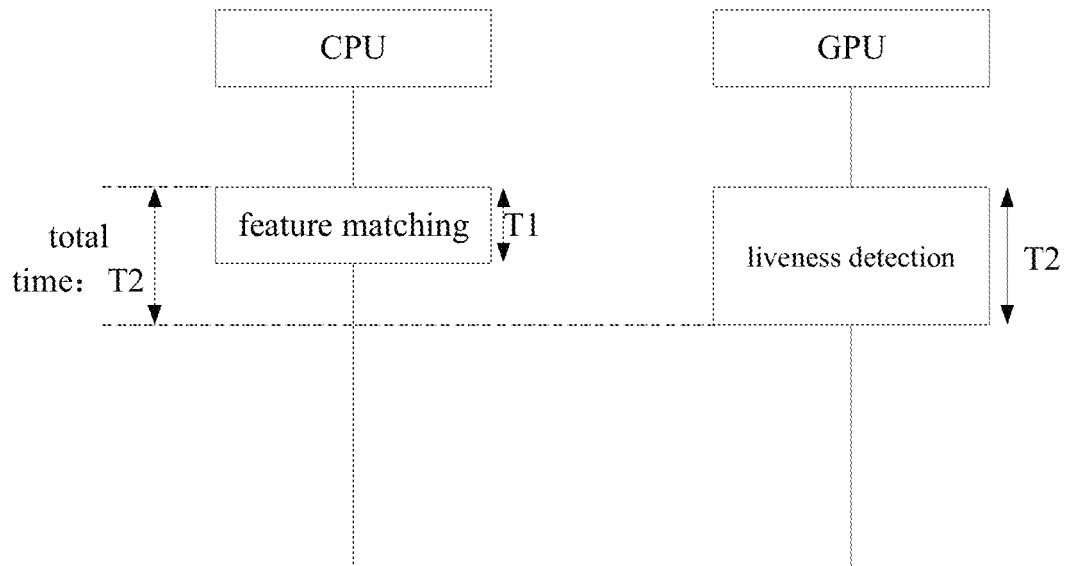
FIG. 3 is a flow chart illustrating a process of performing feature matching and liveness detection in parallel according to an embodiment of the present disclosure.

Referring to FIG. 3, FIG. 3 is a flow chart illustrating a process of performing feature matching and liveness detection in parallel according to an embodiment of the present disclosure. As illustrated in FIG. 3, the GPU performs the liveness detection at the same time when the CPU performs the feature matching. However, in practical, a length T1 of time required for the feature matching is short (about 20-30 ms), while a length T2 of time required for the liveness detection is long (about 300 ms). The length of time required for the facial recognition can be reduced to the length T2 of time required for the liveness detection, i.e., T1+T2 can be reduced to T2.

Further, the process of liveness detection can be divided into 2-3 models. For example, the process of liveness detection can be divided into 2 models respectively for depth of field detection and blink detection. When the GPU performs the liveness detection, the depth of field detection and the blink detection can be performed in parallel, such that the length of time required for the facial recognition can be further reduced.

Figure 4:
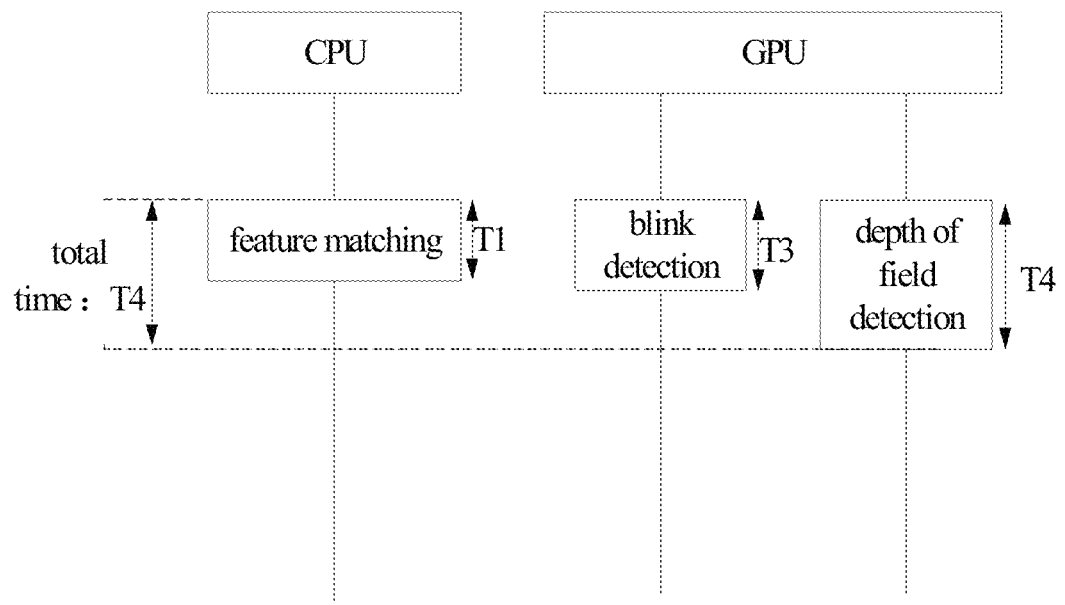
FIG. 4 is a flow chart illustrating a process of performing feature matching and liveness detection in parallel according to another embodiment of the present disclosure.

Referring to FIG. 4, FIG. 4 is a flow chart illustrating a process of performing the feature matching and the liveness detection in parallel according to another embodiment of the present disclosure. In this embodiment, the process of liveness detection is divided into depth of field detection and blink detection, which are performed in parallel. For example, if the length of time required for the feature matching is T1, the length of time required for the liveness detection is T2, the length of time required for the blink detection is T3, the length of time required for the depth of field detection is T4, where T3+T4=T2 and T4>T3>T1, then in the situation in which the feature matching, the blink detection and the depth of field detection are performed in parallel, the length of time required for the facial recognition is reduced from T1+T2 to T4, such that the length of time required for the facial recognition is further reduced.

In addition, as a possible implementation, the front camera 130 can also acquire more than one face image at different collection angles. The CPU can perform the feature matching according to the plurality of face images to improve accuracy of the feature matching. On the other hand, the GPU can perform the depth of field detection and the blink detection according to the plurality of face images acquired at different angles.

Figure 5:
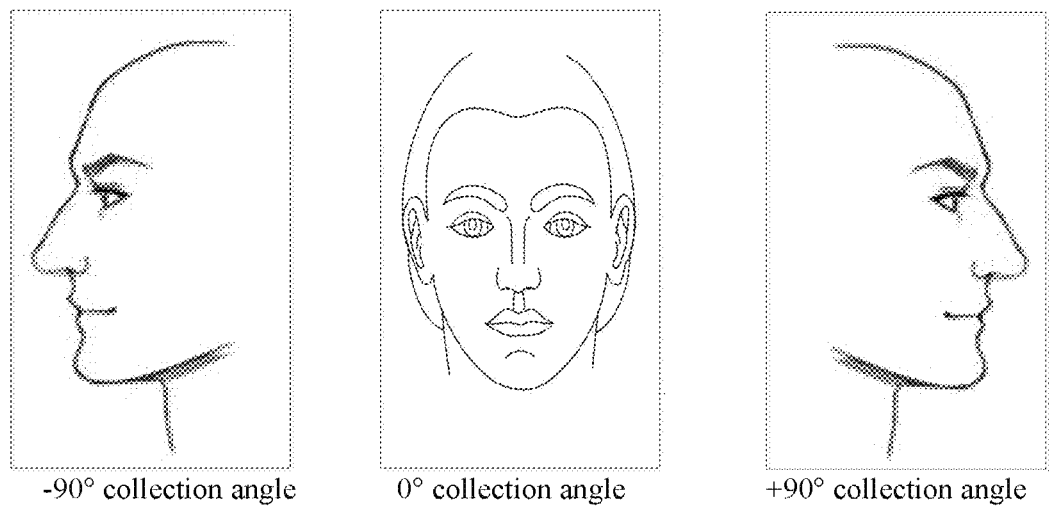
FIG. 5 is a schematic diagram illustrating face images at different angles according to another embodiment of the present disclosure.

Referring to FIG. 5, FIG. 5 is a schematic diagram illustrating face images at different angles according to an embodiment of the present disclosure. The collection angle may range from −90° to +90°. When the collection angle is −90°, the left face of the user faces to the camera. When the collection angle is 0°, the front face of the user faces to the camera. When the collection angle is +90°, the right face of the user faces to the camera. FIG. 5 illustrates the face images acquired when the collection angle is −90°, 0° and +90°.

Figure 6:
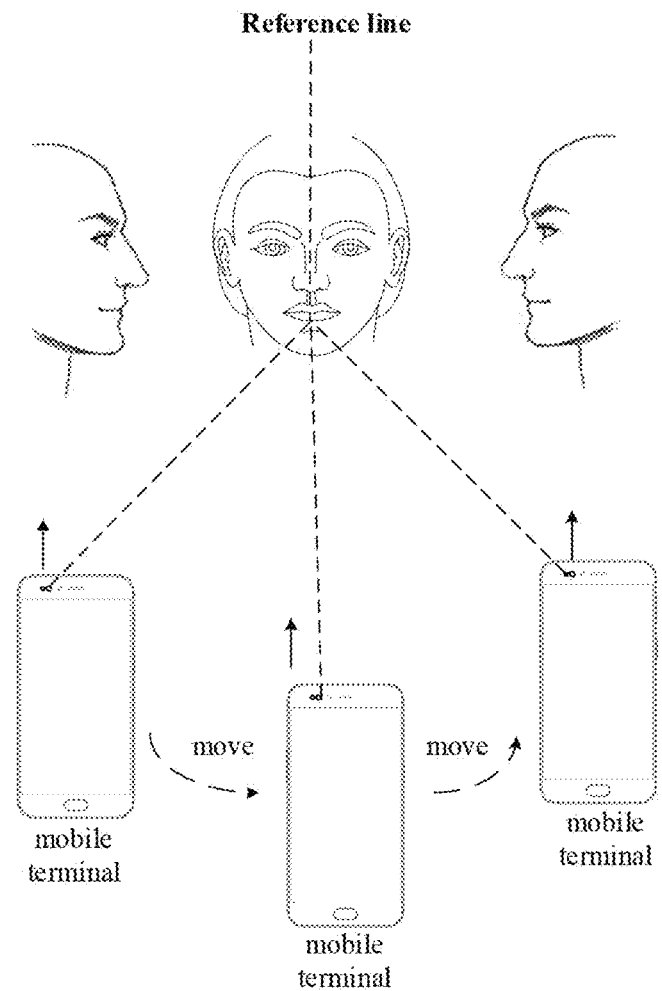
FIG. 6 is a schematic diagram illustrating a scene of acquiring face images at different angles according to another embodiment of the present disclosure.

When the face images are acquired at different collection angles, the user may turn around the head to acquire the face images at different collection angles, or the user may move a phone to acquire the face images at different angles. Referring to FIG. 6, FIG. 6 is a schematic diagram illustrating a scene of acquiring face images at different angles according to an embodiment of the present disclosure. As illustrated in FIG. 6, the user holds the mobile terminal and moves the mobile terminal to acquire the face images at different angles.

When performing the depth of field detection, the GPU is configured to: determine a plurality of values of depth of field in different regions of each face image according to the more than one face image; and determine a detection object is a non-living body when the plurality of values of depth of field are identical.

In this embodiment, since the face is tridimensional and height differences exist between the face and surroundings, the value of depth of field is not constant in the captured face image. When the plurality of values of depth of field are identical, the current detection object may be a photo, which means that the current detection object can be determined as non-living body.

When performing the blink detection, the GPU is configured to: extract a plurality of eye regions from the more than one image; and analyze change in the plurality of eye regions to determine whether the detection object is a living body.

In this embodiment, the front camera 130 can acquire a plurality of face images continuously, extract the eye region from each face image and compare the eye region from each face image to determine whether change occurs in an area of pupil, an area of white of eye and an area of eyelid. If the change occurs in any of the area of pupil the area of white of eye and the area of eyelid, it can be determined that the user blinks during capturing the face image. If no change occurs in any of the area of pupil the area of white of eye and the area of eyelid, it can be determined that the user does not blink during capturing the face image, which means that the current detection object is a photo, and the current detection object can be determined as a non-living body.

With the mobile terminal described in FIG. 1, the CPU and the GPU of the mobile terminal can be called to perform the feature matching and the liveness detection of the facial recognition in parallel, such that the length of time required for the facial recognition can be reduced and the user experience can be improved.

Figure 7:
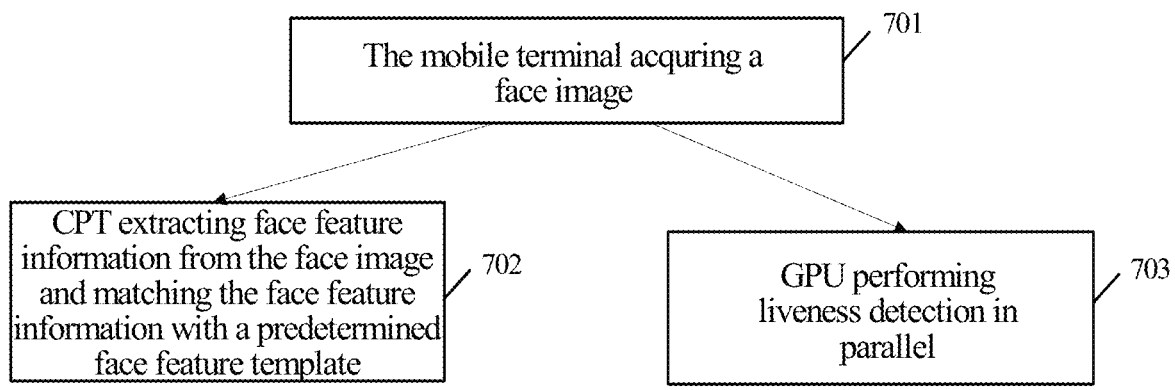
FIG. 7 is a flow chart of a facial recognition method according to an embodiment of the present disclosure.

Referring to FIG. 7, FIG. 7 is a flow chart of a facial recognition method according to an embodiment of the present disclosure. The facial recognition method may include the followings.

At block 701, a mobile terminal acquires a face image.

In the embodiment of the present disclosure, the mobile terminal may acquire more than one face image at different collection angles and performs the feature matching according to the plurality of face images to improve the accuracy of the feature matching. On the other hand, the depth of field detection and the blink detection can be performed according to the plurality of face images acquired at different angles.

At block 702, the CPU extracts face feature information from the face image and matches the face feature information with a predetermined face feature template.

In the embodiment of the present disclosure, the facial recognition is divided into the feature matching (i.e., extracting the face feature information from the face image and matching the face feature information with the face feature template) and the liveness detection, and the CPU and the GPU are called to perform the feature matching and the liveness detection in parallel, such that the length of time required for the facial recognition can be reduced.

At block 703, the GPU performs the liveness detection according to the face image when the CPU extracts the face feature information from the face image and matches the face feature information with a predetermined face feature template.

Further, the process of liveness detection can be divided into 2-3 models. For example, the process of liveness detection can be divided into 2 models respectively for depth of field detection and blink detection. When the GPU performs the liveness detection, the depth of field detection and the blink detection can be performed in parallel, such that the length of time required for the facial recognition can be further reduced.

With the facial recognition method described in FIG. 7, the CPU and the GPU of the mobile terminal can be called to perform the feature matching and the liveness detection of the facial recognition in parallel, such that the length of time required for the facial recognition can be reduced and the user experience can be improved.

Figure 8:
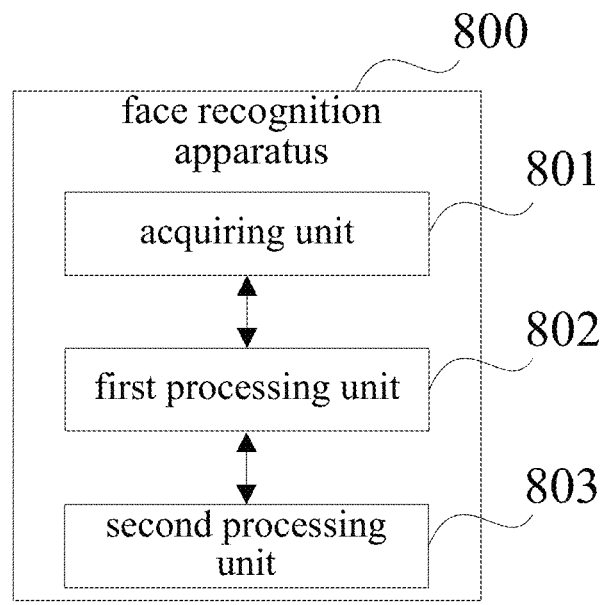
FIG. 8 is a block diagram of a facial recognition apparatus according to an embodiment of the present disclosure.

Referring to FIG. 8, FIG. 8 is a schematic diagram of a facial recognition apparatus 800 according to an embodiment of the present disclosure. As illustrated in FIG. 8, the facial recognition apparatus 800 includes an acquiring unit 801, a first processing unit 802 and a second processing unit 803.

The acquiring unit 801 is configured to acquire a face image.

The first processing unit 802 is configured to extract face feature information from the face image and to match the face feature information with a predetermined face feature template.

The second processing unit 803 is configured to perform liveness detection according to the face image when the first processing unit 802 extracts the face feature information from the face image and matches the face feature information with a predetermined face feature template.

It should be understood that, in order to implement the aforementioned functions, the mobile terminal includes hardware structure and/or software structure for executing respective functions. A person skilled in the art may be further aware that, in combination with the examples described in the embodiments disclosed in this specification, units and algorithm steps may be implemented by electronic hardware, computer software, or a combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The unit division is performed on the mobile terminal according to the method embodiments described above. For example, a functional unit may correspond to a function, or two or more units may be integrated in one processing unit. The integrated unit as described above may be achieved in the form of hardware, or may be achieved in the form of a software functional module. It should be noted that, the unit division in embodiments described above can be merely exemplary, for example, the units are just divided according to logic functions.

As a possible implementation, the first processing unit 802 may be a central processing unit (CPU), a general processor, a digital signal processor (DSP), an application-specific integrated circuit (ASIC), a field programmable gate array (FPGA) or a programmable logic device, a transistor logic device, a hardware component or combination thereof. The second processing unit 803 may be a graphics processing unit (GPU). The acquiring unit 801 may be a front camera.

With the facial recognition apparatus described in FIG. 8, the CPU and the GPU of the mobile terminal can be called to perform the feature matching and the liveness detection of the facial recognition in parallel, such that the length of time required for the facial recognition can be reduced and the user experience can be improved.

Figure 9:
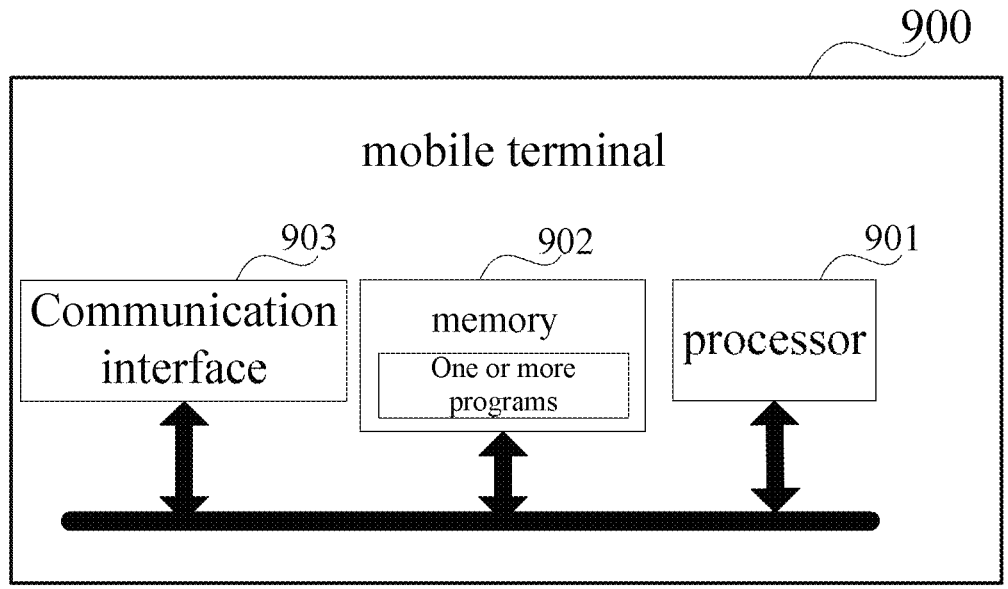
FIG. 9 is a schematic diagram of a mobile terminal according to an embodiment of the present disclosure.

Referring to FIG. 9, FIG. 9 is a schematic diagram of a mobile terminal 900 according to an embodiment of the present disclosure. As illustrated in FIG. 9, the mobile terminal 900 includes a processor 901, a memory 902, a communication interface 903 and one or more programs. The one or more programs are stored in the memory, and are configured to be executed by the processor. The one or more programs include instructions for performing acts in the method embodiments described above.

For example, the one or more programs include instructions for performing the followings: acquiring by a mobile terminal a face image; extracting face feature information by a central processing unit (CPU) of the mobile terminal from the face image and matching the face feature information with a predetermined face feature template; performing by a graphics processing unit (GPU) of the mobile terminal liveness detection according to the face image when the CPU extracts the face feature information from the face image and matches the face feature information with the predetermined face feature template.

Further, the liveness detection includes blink detection and depth of field detection. When performing the liveness detection according to the face image, the one or more programs include instructions for performing the followings: performing the blink detection and the depth of field detection in parallel.

Further, when acquiring the face image, the one or more programs include instructions for performing the followings: acquiring more than one face image at different collection angles.

As a possible implementation, when performing the depth of field detection, the one or more programs include instructions for performing the followings: determining a plurality of values of depth of field in different regions of each face image from the more than one face image; and determining that a detection object is a non-living body when the plurality of values of depth of field are identical.

As a possible implementation, when performing the blink detection, the one or more programs include instructions for performing the followings: extracting a plurality of eye regions from the more than one face image; and analyzing change in the plurality of eye regions to determine whether a detection object is a living body.

With the mobile terminal described in FIG. 9, the CPU and the GPU of the mobile terminal can be called to perform the feature matching and the liveness detection of the facial recognition in parallel, such that the length of time required for the facial recognition can be reduced and the user experience can be improved.

Figure 10:
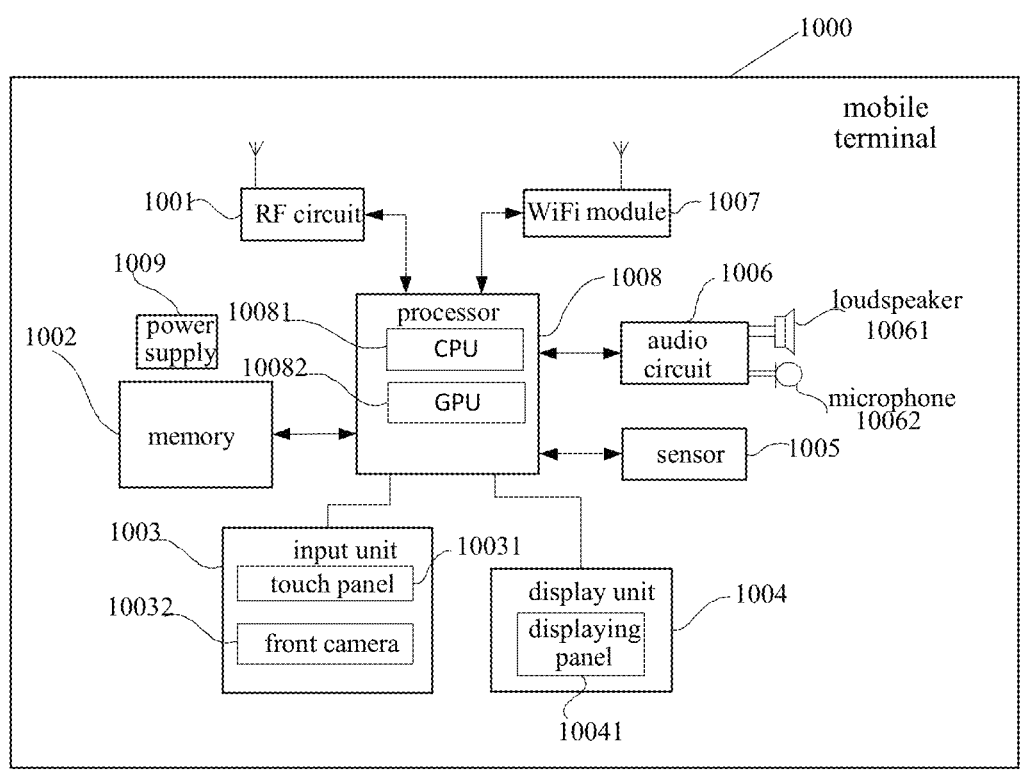
FIG. 10 is a schematic diagram of a mobile terminal according to another embodiment of the present disclosure.

Referring to FIG. 10, FIG. 10 is a schematic diagram of a mobile terminal 1000 according to another embodiment of the present disclosure. As illustrated in FIG. 10, for convenience of description, parts related to embodiments of the present disclosure are illustrated only. Regarding specific technical details which are not disclosed, reference can be made to the description of the method embodiments. The mobile terminal may include a mobile phone, a tablet computer, a personal digital assistant (PDA), a point of sales (POS), a vehicle-mounted computer and the like. The present disclosure takes the mobile phone as an example.

FIG. 10 illustrates a structure diagram of a mobile phone related to the mobile terminal provided by embodiments of the present disclosure. Referring to FIG. 10, the mobile phone may include a radio frequency (RF) circuit 1001, a memory 1002, an input unit 1003, a display unit 1004, a sensor 1005, an audio circuit 1006, a wireless fidelity (WiFi) module 1007, a processor 1008, and a power supply 1009.

It will be understood by those skilled in the art that the structure illustrated in FIG. 10 does not constitute a limitation on the mobile phone. Compared to the drawing illustrated, more or fewer components may be included, or a combination of some components or different component arrangements may also be possible.

Respective components of the mobile phone will be described in detail with reference to FIG. 10.

The RF circuit 1001 may be configured to receive and send information or receive and send signals during calling. After downlink information of a station is received, the downlink information is processed by the processor 1008. Further, uplink data is sent to the station. Generally, the RF circuit 1001 includes, but is not limited to, an antenna, at least one amplifier, a transceiver, a coupler, a low noise amplifier (LNA), a duplexer and the like. In addition, the RF circuit 1001 may also communicate with another device by a network and wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1002 may be configured to store a software program and modules. The processor 1008 runs the software program and modules stored in the memory 1002, to implement various functional applications and data processes of the mobile phone. The memory 1002 may mainly include a program storage area and a data storage area. The program storage area may store an operating system, an application program (for example, audio play function, video play function) required by at least one function and the like. The data storage area may store data (for example, audio data, telephone book) created according to usage of the mobile phone, and the like. In addition, the memory 1002 may include a high speed random access memory, and may also include a non-volatile memory such as at least one magnetic disk storage device, a flash memory, or another volatile solid-state storage device.

The input unit 1003 may be configured to receive input digital or character information, and a key signal input related to user's setup and functional control of the mobile phone. Specifically, the input unit 1003 may include a touch panel 10031 and a biological recognition component 10032. The touch panel 10031, also called as touch screen, may collect touch operations of the user performed thereon (for example, the user uses the finger, a pen or other suitable item or accessory to perform operations on the touch panel 10031 or near the touch panel 10031) and drive corresponding connected device according to predetermined procedure. The touch panel 10031 may include a touch detection device and a touch controller. The touch detection device may detect direction and position of a touch operation, detect signal caused by the touch operation and send the signal to the touch controller. The touch controller may receive touch information from the touch detection device and transform the touch information to coordinates of touch points and send the coordinates to the processor 1008. Further the touch controller can receive commands sent from the processor 1008 and execute the commands. Further, the touch panel 10031 can be implemented as resistive, capacitive, infrared ray or surface acoustic wave (SAW) form. Besides the touch panel 10031, the input unit 1003 may further include a front camera 10032.

The display unit 1004 may be configured to display information input by the user or information provided for the user, and various menus of the mobile phone. The display unit 1004 may include a displaying panel 10041. Optionally, the displaying panel 10041 may be configured by using a liquid crystal display (LCD), an organic light-emitting diode (OLED), or the like. Further, the touch panel 10031 may cover the displaying panel 10041. When the touch panel 10031 detects a touch operation on the touch panel or near the touch panel, the touch operation is sent to the processor 1008 to determine the type of touch event. The processor 1008 provides corresponding visual output on the displaying panel 10041 according to the type of the touch event. In FIG. 10, although the touch panel 10031 and the displaying panel 941 may be used as two separate components to realize the input and output function of the mobile phone, in some embodiments, the touch panel 10031 and the displaying panel 941 may be integrated to realize the input and playing function of the mobile phone.

The mobile phone may further include at least one sensor 1005, such as an optical sensor, a motion sensor and other sensors. Specifically, the optical sensor may include an ambient light sensor and a proximity sensor. The ambient light sensor can adjust luminance of the displaying panel 10041 according to brightness of the ambient light. The proximity sensor may switch off the displaying panel 10041 and/or backlight when the mobile phone is moved to the ear. As one type of motion sensor, an acceleration sensor can detect acceleration values in various directions (generally on three axes), may detect magnitude and a direction of the gravity when the mobile phone is static, and may be applied to an application that recognizes the attitude of the mobile phone (for example, landscape/portrait screen switching, a related game, and magnetometer attitude calibration), a function related to vibration recognition (such as a pedometer and a knocking), and the like. In addition, the mobile phone can be configured with other sensors, such as a barometer, a hygrometer, a thermometer, and an infrared sensor, which are not further described herein.

The audio circuit 1006, a loudspeaker 10061, and a microphone 10062 may provide audio interfaces between the user and the mobile phone. The audio circuit 1006 may convert received audio data into an electrical signal and transmit the electrical signal to the loudspeaker 10061. The loudspeaker 1061 converts the electrical signal into a sound signal for outputting. On the other hand, the microphone 10062 converts a collected sound signal into an electrical signal. The audio circuit 1006 receives the electrical signal and converts the electrical signal into audio data, and outputs the audio data to the processor 1008 for processing. Then, the processor 1008 sends the audio data to, for example, another mobile terminal by using the RF circuit 1001, or outputs the audio data to the memory 1002 for further processing.

WiFi is a short distance wireless transmission technology. The mobile phone may help, by using the WiFi module 1007, the user to receive and send e-mails, browse a webpage, access streaming media, and so on. The WiFi module 1007 provides wireless broadband Internet access for the user. Although the WiFi module 1007 is illustrated in FIG. 10, it can be understood that the WiFi module 1007 is not essential for the mobile phone, and may be omitted when required as long as the scope of the essence of the present disclosure is not changed.

The processor 1008 is a control center of the mobile phone, which can use various interfaces and wires to couple respective parts of the mobile phone, and perform various functions and processing data of the mobile phone by running or executing software programs and/or modules stored in the memory 1002 and calling data stored in the memory 1002, so as to monitor the mobile phone overall. In an embodiment, the processor 1008 may include one or more processing units. In an embodiment, the processor 1008 may integrate an application processor and a modem processor, in which the application processor is mainly configured to process the operating system, the user interface and applications, and the modem processor is mainly configured to process wireless communication. It could be understood that the above-described modem processor may be not integrated in the processor 1008. In the embodiments of the present disclosure, the processor 1008 may include a CPU 10081 and a GPU 10082.

The mobile phone further includes the power supply 1009 (such as a battery) for supplying power to the components. In an embodiment, the power supply may be logically coupled with the processor 1008 by using a power management system, thereby implementing functions such as charging, discharging and power consumption management by using the power management system.

Although not illustrated in the figure, the mobile phone may further include a camera, a Bluetooth module and the like, which are not described herein.

The flow of the method embodiment illustrated in FIG. 7 can be implemented based on the structure of the mobile phone.

The functions of respective units in the embodiment illustrated in FIG. 8 can be implemented based on the structure of the mobile phone.

For example, the processor 1008 can call the computer program stored in the memory 1002 to perform the followings: acquiring by a mobile terminal a face image; extracting face feature information by a central processing unit (CPU) of the mobile terminal from the face image and matching the face feature information with a predetermined face feature template; performing by a graphics processing unit (GPU) of the mobile terminal liveness detection according to the face image when the CPU extracts the face feature information from the face image and matches the face feature information with the predetermined face feature template.

Embodiments of the present disclosure also provide a computer readable storage medium having computer programs for exchanging digital data stored thereon, in which the computer programs are executed to perform all or a part of acts of the method according to the above method embodiments of the present disclosure.

Embodiments of the present disclosure also provide a computer readable storage medium having computer programs for exchanging digital data stored thereon, in which the computer programs are executed to perform all or a part of acts of the method according to the above method embodiments of the present disclosure. The computer program product may be a software installation package, and the computer includes a mobile terminal.

It should be noted that, for convenience and simplicity of description, the above method embodiments are described in a form of a combination of a series of steps. However, those skilled in the art can understand clearly that, the present disclosure is not limited by the order of the steps, since some steps may be performed simultaneously or in other orders according to present disclosure. In addition, those skilled in the art can understand clearly that, the described embodiments are preferred embodiments, of which relative steps or modules may be unnecessary for the present disclosure.

In above embodiments, each embodiment may be described with focusing on different aspects. Parts not be described in some embodiments may refer to relative descriptions in other embodiments.

It should be understood that, the apparatus disclosed in several embodiments provided by the present disclosure can be realized in any other manner. For example, the apparatus embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in form of hardware, or in form of functional software units.

If the integrated unit is implemented in form of functional software units and are sold or used as separate products, it can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or an optical disk.

It should be understood that all or a part of the method provided by the present disclosure may be realized by programs instructing relative hardware, the programs may be stored in a computer-readable memory. The memory may include a flash disk, an ROM, an RAM, a magnet disk, an optical disk and the like.

The forgoing description is only directed to preferred embodiments of the present disclosure, but not used to limit the present disclosure. Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure. In conclusion, the specification cannot be construed to limit the present disclosure.

What is claimed is:

1. A facial recognition method, comprising:
    acquiring a face image by a mobile terminal;
    extracting face feature information from the face image and matching the face feature information with a predetermined face feature template by a central processing unit of the mobile terminal;
    performing liveness detection according to the face image by a graphics processing unit of the mobile terminal, when the central processing unit extracts the face feature information from the face image and matches the face feature information with the predetermined face feature template;
    wherein a length of time required for extracting and matching the face feature information is less than a length of time required for the liveness detection, and a length of time required for facial recognition is equal to the length of time required for the liveness detection.

2. The method according to claim 1, wherein the liveness detection comprises blink detection and depth of field detection, and performing the liveness detection according to the face image comprises:
    performing the blink detection and the depth of field detection in parallel.

3. The method according to claim 2, wherein acquiring the face image comprises:
    acquiring more than one face image at different collection angles.

4. The method according to claim 3, wherein acquiring more than one face image at different collection angles comprises:
    acquiring more than one face image at different collection angles by enabling the mobile terminal to be oriented to a face of a user at the different collection angles.

5. The method according to claim 3, wherein performing the depth of field detection comprises:
    determining a plurality of values of depth of field in different regions of each face image from the more than one face image; and
    determining that a detection object is a non-living body when the plurality of values of depth of field are identical.

6. The method according to claim 3, wherein performing the blink detection comprises:
    extracting a plurality of eye regions from the more than one face image; and
    analyzing change in the plurality of eye regions to determine whether a detection object is a living body.

7. The method according to claim 6, wherein analyzing change in the plurality of eye regions to determine whether a detection object is a living body comprises:
    comparing the plurality of eye regions with each other to determine whether change occurs in an area of pupil, an area of white of eye and an area of eyelid; and
    when the change occurs in any of the area of pupil the area of white of eye and the area of eyelid, determining a detection object as a living body, when no change occurs in any of the area of pupil the area of white of eye and the area of eyelid, determining the detection object as a non-living body.

8. The method according to claim 1, before acquiring the face image, further comprising:
    triggering facial recognition in response to unlocking the mobile terminal, accessing to information stored in the mobile terminal or a payment process.

9. A mobile terminal, comprising a central processing unit, a graphics processing unit, a front camera and a memory, wherein the central processing unit, the graphics processing unit, the front camera and the memory are coupled with each other, wherein the memory is configured to store a face feature template;

the front camera is configured to acquire a face image;

the central processing unit is configured to extract face feature information from the face image and to match the face feature information with the face feature template; and the graphics processing unit is configured to perform liveness detection according to the face image when the central processing unit extracts the face feature information from the face image and matches the face feature information with the face feature template;

wherein a length of time required for extracting and matching the face feature information is less than a length of time required for the liveness detection, and a length of time required for facial recognition is equal to the length of time required for the liveness detection.

10. The mobile terminal according to claim 9, wherein the liveness detection comprises blink detection and depth of field detection, when performing the liveness detection according to the face image, the graphics processing unit is configured to:

perform the blink detection and the depth of field detection in parallel.

11. The mobile terminal according to claim 10, wherein when acquiring the face image, the front camera is configured to:

acquire more than one face image at different collection angles.

12. The mobile terminal according to claim 11, wherein when performing the depth of field detection, the GPU is configured to:

determine a plurality of values of depth of field in different regions of each face image from the more than one face image; and determine that a detection object is a non-living body when the plurality of values of depth of field are identical.

13. The mobile terminal according to claim 11, wherein when performing the blink detection, the graphics processing unit is configured to:

extract a plurality of eye regions from the more than one image; and analyze change in the plurality of eye regions to determine whether a detection object is a living body.

14. The mobile terminal according to claim 13, wherein when analyzing change in the plurality of eye regions to determine whether a detection object is a living body, the graphics processing unit is configured to:

compare the plurality of eye regions with each other to determine whether change occurs in an area of pupil, an area of white of eye and an area of eyelid; and when the change occurs in any of the area of pupil the area of white of eye and the area of eyelid, determine a detection object as a living body, when no change occurs in any of the area of pupil the area of white of eye and the area of eyelid, determine the detection object as a non-living body.

15. The mobile terminal according to claim 9, wherein before acquiring the face image, the CPU is configured to:

trigger facial recognition in response to unlocking the mobile terminal, accessing to information stored in the mobile terminal or a payment process.

16. A non-transitory computer-readable storage medium, having a computer program for electronic data exchange stored thereon, wherein the computer program causes a computer to perform the method comprising:

acquiring a face image by a mobile terminal;

extracting face feature information from the face image and matching the face feature information with a predetermined face feature template by a central processing unit of the mobile terminal;

performing liveness detection according to the face image by a graphics processing unit of the mobile terminal when the central processing unit extracts the face feature information from the face image and matches the face feature information with the predetermined face feature template;

wherein a length of time required for extracting and matching the face feature information is less than a length of time required for the liveness detection, and a length of time required for facial recognition is equal to the length of time required for the liveness detection.

* * * * *